United States Patent
Vedder et al.

(10) Patent No.: US 8,727,443 B2
(45) Date of Patent: May 20, 2014

(54) LOCKING ELEMENT FOR A VEHICLE SEAT

(75) Inventors: Andreas Vedder, Haan (DE); Igor Gordenko, Cologne (DE)

(73) Assignee: Johnson Controls Technology Company, Holland, MI (US)

( * ) Notice: Subject to any disclaimer, the term of this patent is extended or adjusted under 35 U.S.C. 154(b) by 369 days.

(21) Appl. No.: 13/124,497

(22) PCT Filed: Oct. 6, 2009

(86) PCT No.: PCT/EP2009/009357
§ 371 (c)(1),
(2), (4) Date: Jul. 11, 2011

(87) PCT Pub. No.: WO2010/054860
PCT Pub. Date: May 20, 2010

(65) Prior Publication Data
US 2011/0254343 A1      Oct. 20, 2011

(30) Foreign Application Priority Data

Oct. 17, 2008   (DE) .......................... 10 2008 051 832

(51) Int. Cl.
*B60N 2/02*       (2006.01)

(52) U.S. Cl.
USPC .................................... 297/378.13; 297/335

(58) Field of Classification Search
USPC ....................................................... 297/335
See application file for complete search history.

(56) References Cited

U.S. PATENT DOCUMENTS

| | | | |
|---|---|---|---|
| 4,896,907 A * | 1/1990 | Hayakawa et al. | ........... 292/216 |
| 5,722,730 A | 3/1998 | McKernan | |
| 7,954,898 B2 * | 6/2011 | Van De Geer et al. | ... 297/378.13 |
| 8,177,298 B2 * | 5/2012 | Lindner et al. | ........... 297/188.07 |
| 8,342,605 B2 * | 1/2013 | Tanaka et al. | ............ 297/378.13 |
| 2004/0262973 A1 * | 12/2004 | Reubeuze et al. | ....... 297/378.13 |
| 2006/0208505 A1 * | 9/2006 | Christoffel et al. | ........... 292/216 |
| 2008/0203800 A1 * | 8/2008 | van de Geer et al. | ..... 297/378.12 |
| 2010/0320777 A1 * | 12/2010 | Jankowski et al. | ........... 292/200 |
| 2012/0193963 A1 * | 8/2012 | Lutzka et al. | ............. 297/378.13 |

FOREIGN PATENT DOCUMENTS

| | | |
|---|---|---|
| DE | 101 57 211 A1 | 6/2003 |
| DE | 20216345 U1 | 3/2004 |
| DE | 103 08 678 B3 | 9/2004 |
| DE | 10 2004 001 766 B3 | 5/2005 |
| DE | 20 2005 005 689 A1 | 9/2006 |
| DE | 10 2006 058 151 B3 | 12/2007 |
| EP | 1516771 A1 | 3/2005 |
| FR | 2 856 718 A1 | 12/2004 |
| GB | 2 197 682 A | 5/1988 |
| JP | 1988-130881 A | 6/1988 |

OTHER PUBLICATIONS

International Search Report for application No. PCT/EP2009/009357 mailed May 7, 2010.
German Office Action, 10 2008 051 832.8-16; Jun. 25, 2009; pp. 1-3.
Japanese Office Action mailed Feb. 26, 2013.

* cited by examiner

*Primary Examiner* — David E Allred
(74) *Attorney, Agent, or Firm* — Fletcher Yoder P.C.

(57) ABSTRACT

A locking element for a vehicle seat serves to lock the backrest to a seat part and/or to the body of the vehicle. The element comprises a rotatably mounted rotary catch which interacts with a pin in a locking manner. A rotatably mounted latching pawl secures the rotary catch in its locking position. In case of an accident, the rotary catch and the latching pawl are displaced relative to a housing part.

8 Claims, 2 Drawing Sheets

LOCKING ELEMENT FOR A VEHICLE SEAT

CROSS REFERENCE TO RELATED APPLICATIONS

This application claims priority from and the benefit of PCT Application No. PCT/EP2009/009357, filed on Oct. 6, 2009 and German Patent DE 10 2008 051 832.8, filed on Oct. 17, 2008; all entitled "Locking Element for a Vehicle Seat", which are herein incorporated by reference.

BACKGROUND

The present invention relates to a locking element for a vehicle seat for locking the backrest to a seat part and/or to the body of the vehicle, having a rotatably mounted rotary catch which interacts with a pin in a locking manner and having a rotatably mounted latching pawl which secures the rotary catch in its locking position.

Generic locking elements of this type are known from the prior art, for example DE 20 2005 005 689 U1 and EP 1 516 771. Further prior art is DE 202 16 345 U1.

Proceeding from this prior art, it was the object to provide a further locking element which, in the case of an accident, prevents opening of the locking means reliably without being of complicated construction.

The object is achieved by way of a locking element for a vehicle seat for locking the backrest to a seat part and/or to the body of the vehicle, having a rotatably mounted rotary catch which interacts with the pin in a locking manner and having a rotatably mounted latching pawl which secures the rotary catch in its locking position, the rotary catch and the latching pawl being displaced relative to a housing part in the case of an accident.

SUMMARY

The present invention relates to a locking element for a vehicle seat. A vehicle seat of this type can afford space to one or more persons. As a result, the vehicle seat can also be a seating bench. The vehicle seat has a seat part and a backrest, it being possible for the backrest to be folded forward out of a use position, in which a seat occupant can sit down on the seat, in order to increase the loading space of the vehicle or to facilitate the entry into the vehicle. In order to fix the backrest in the use position, the vehicle seat requires a locking means which locks the backrest reversibly to the seat part and/or to the body of the vehicle.

For this purpose, the locking element according to the invention has a rotary catch which is arranged, for example, on the backrest, and a pin which is connected, for example, to the seat part or the vehicle body. In the locked state, the rotary catch and the pin interact in a positive and/or nonpositive manner.

If required, the locking means can be opened. In the case of an accident, however, it has to be ensured that the locking means does not open. The locking element according to the invention therefore has a latching pawl which fixes the rotary catch in its locking position, in which said latching pawl interacts positively and/or nonpositively with said rotary catch.

According to the invention, in the case of an accident, both the rotary catch and the latching pawl are displaced relative to the housing, in which they are situated. As a result, their positive and/or nonpositive connection is at least not lost and is perhaps even improved further because the rotary catch and the latching pawl become wedged in one another.

Under normal conditions, the rotary catch is preferably provided in such a way that the rotary catch does not touch the housing, in which it is situated, that is to say there is an at least small gap everywhere between the housing and the rotary catch. In the case of an accident and the displacement according to the invention of the rotary catch and the latching pawl relative to the housing which is produced as a result, the rotary catch is given at least one, preferably two, additional bearing point/points on the housing, however. Undesired opening of the locking means is additionally prevented by the bearing point/points. Furthermore or in addition, at least some components of the locking element according to the invention, in particular the rotary catch and/or the housing, can be designed with a smaller material thickness and/or a more simple material because an improved load distribution takes place as a result of the additional bearing points.

According to one preferred embodiment, the rotary catch and the latching pawl are mounted in each case by way of a bearing on the housing, said bearing being deformed particularly preferably plastically in the case of an accident, which results in the displacement according to the invention. Very particularly preferably, said bearings are made at least partially from plastic.

In one preferred embodiment, the locking element has a tolerance compensation pawl which likewise secures the rotary catch in its locking position. This tolerance compensation pawl is required, for example, for compensating for manufacturing tolerances and/or if what are known as tumbling recliners are used, with which a comfort adjustment of the inclination of the backrest takes place.

The tolerance compensation pawl preferably has the same bearing as the latching pawl and, in the case of an accident, is likewise displaced relative to the housing.

DRAWINGS

In the following text, the invention will be explained using FIGS. 1-3. These explanations are merely by way of example and do not restrict the general concept of the invention.

DETAILED DESCRIPTION

Figure 1:
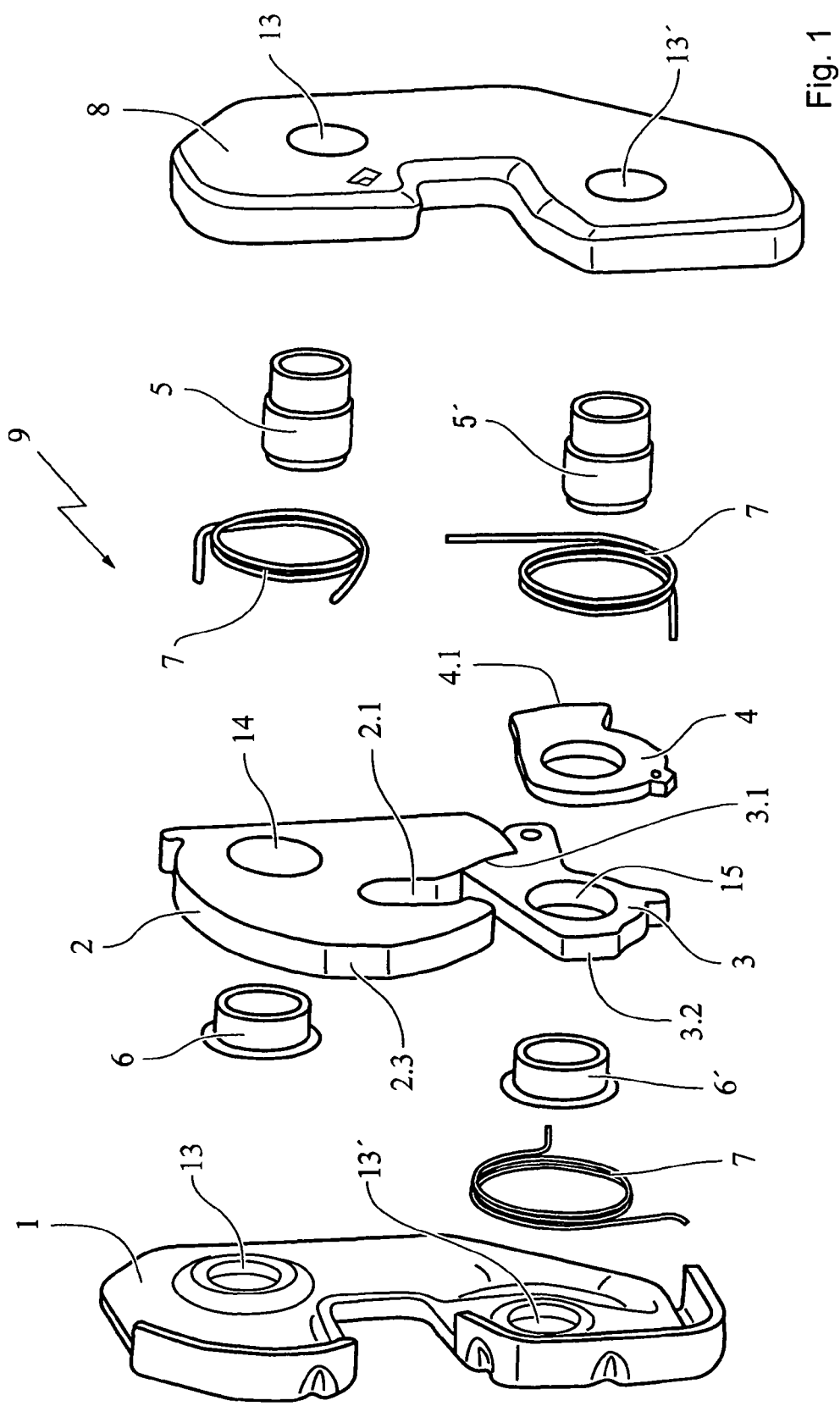
FIG. 1 shows the locking element according to the invention.

FIG. 1 shows an exploded drawing of the locking element 9 according to the invention which is arranged on the backrest of a vehicle seat in the present case. The locking element has a housing which comprises a housing part 8 and a side plate 1 which are connected to one another. The rotary catch 2 and the latching pawl 3 are mounted rotatably on both housing parts 1, 8. For this purpose, the bushes 5, 5' and the sliding bushes 6, 6' are provided, the bushes 5, 5' being mounted in the openings 13, 13' in the housing and the sliding bush 6, 6' interacting in each case on its inner circumference with a bush 5, 5' and on its outer circumference with the hole 14 of the rotary catch or the hole 15 of the latching pawl. Torsion springs 7 which prestress the rotary catch 2 and the latching pawl 3 rotationally in each case counter to the clockwise direction are provided both on the rotary catch 2 and on the latching pawl 3. FIG. 1 shows the rotary catch in its locked state, in which a slot 2.1 in the rotary catch 2 engages around a pin 12 (cf. FIGS. 2 and 3) which is arranged, for example, on the seat part or the vehicle body. The latching pawl 3 secures the rotary catch 2 in this position, in which the bearing face 2.2 of the rotary catch is in engagement with the bearing face 3.1 of the latching pawl 3. In order to open the locking means, first of all the latching pawl and then the rotary catch are rotated in the clockwise direction. In addition to the latching pawl 3, the locking element also has a tolerance pawl 4 which is likewise mounted rotatably on the bush 5'. The tolerance pawl 4 can rotate at least partially independently of the latching pawl 3 and is likewise prestressed by way of a separate torsion spring, rotatably counter to the clockwise direction. The tolerance pawl 4 has the bearing face 4.1, with which it interacts in a locking manner with the bearing face 2.2 of the rotary catch. As a result, for example, of manufacturing tolerances, the bearing faces between the rotary catch and the latching pawl and between the rotary catch and the tolerance pawl are at least partially different.

Figure 2:
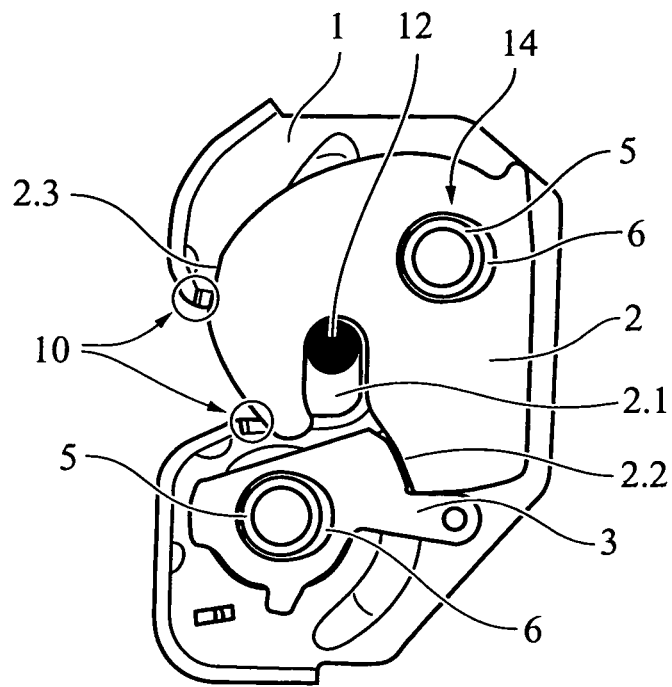
FIG. 2 shows the locking element before an accident.

As can be seen in FIG. 2, there is a gap 10 between the housing part 1 and the rotary catch in normal operation, with the result that said rotary catch can be opened by a rotation in the clockwise direction. Furthermore, it can be seen in this illustration that the recess 14 interacts with the sliding bush 6 in a left-aligned manner.

Figure 3:
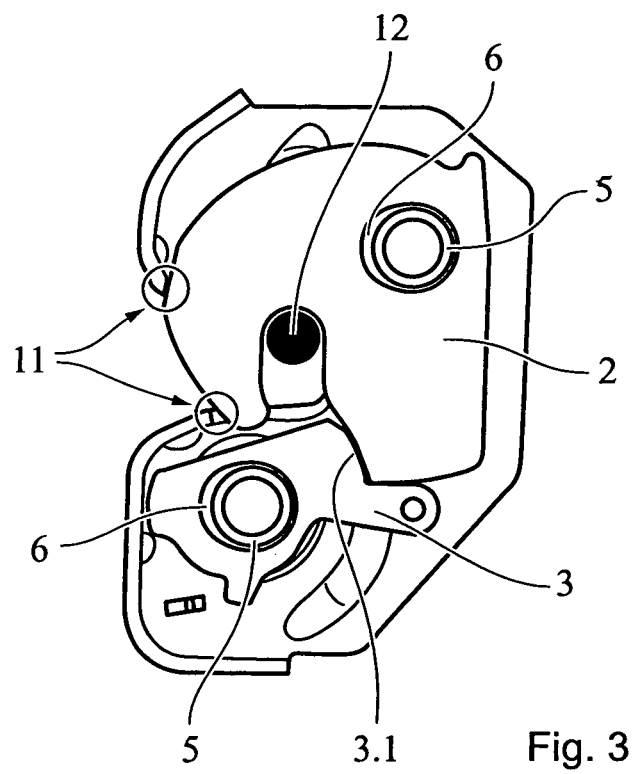
FIG. 3 shows the locking element after an accident.

FIG. 3 shows the configuration according to FIG. 2 after an accident. The sliding bush has been deformed plastically in such a way that the recess then interacts with the recess 14 in a right-aligned manner. The rotary catch 2 and the latching pawl 3 have both been displaced to the left relative to the housing. As a result, the rotary catch bears against two bearing points of the housing, with the result that its rotation in the clockwise direction is impossible. The prevention of the rotation of the rotary catch 2 is preferably assisted by a corresponding shaped portion 2.2 of the rotary catch in the region of at least one bearing point. In the present case, the rotary catch is flattened, which increases the contact area between the rotary catch and the housing. After an accident, the latching pawl also preferably bears against the housing, with the result that the rotation of the latter is also at least made difficult. The prevention of the rotation of the latching pawl 3 is preferably assisted by a corresponding shaped portion 3.2 of the latching pawl in the region of at least one bearing point. In the present case, the latching pawl 3 is flattened, which increases the contact area between the latching pawl and the housing. Furthermore or in addition, at least some components of the locking element according to the invention, in particular the rotary catch 2 and/or the housing 1, can be designed with a smaller material thickness and/or a more simple material because an improved load distribution takes place as a result of the additional bearing points 11.

The adjustment device according to FIGS. 2 and 3 can additionally have a tolerance pawl 4 which, in the case of a crash, is then likewise displaced relative to the housing and preferably bears against the housing.

LIST OF REFERENCE SYMBOLS

1 Housing part, side plate
2 Rotary catch
2.1 Slot
2.2 Bearing face
2.3 Shaped portion, flattened portion
3 Latching pawl
3.1 Bearing face
3.2 Shaped portion, flattened portion
4 Tolerance compensation pawl
5 Bush
5' Bush
6 Sliding bush
6' Sliding bush
7 Spring
8 Housing part
9 Locking element
10 Gap
11 Bearing point
12 Pin
13 Recess in the housing
13' Recess in the housing
14 Recess in the rotary catch
15 Recess in the latching pawl

The invention claimed is:

1. A locking element for a vehicle seat for locking a backrest to a seat part, the backrest to a body of the vehicle, or some combination thereof, comprising a rotatably mounted rotary catch which interacts in a locking manner with a pin fixedly coupled to the seat part, to the body of the vehicle, or some combination thereof, and a rotatably mounted latching pawl which secures the rotary catch in a locking position, wherein:
  before an accident and with the rotary catch in the locking position, the rotary catch is engaged with the pin; and
  during an accident, an impact directs the rotary catch and the latching pawl to be displaced parallel to a main plane of extension of a housing of the vehicle seat in which the rotary catch and the latching pawl are situated, with the locking position maintained between the rotary catch and the latching pawl, and the rotary catch and the latching pawl are each rotatably mounted about a bearing on the housing, wherein the bearings are deformed by their interaction with the rotary catch, the latching pawl, or some combination thereof, during the accident, and each of the bearings comprises a bush, a sliding bush, an inner circumference, and an outer circumference, and wherein the inner circumference interacts with the bush, and the outer circumference interacts with a hole of the rotary catch or a hole of the latching pawl.

2. The locking element claimed in claim 1, wherein the sliding bush is plastically deformed by the impact.

3. The locking element as claimed in claim 1, wherein as a result of the displacement, the rotary catch, the latching pawl, or some combination thereof, are given at least one additional bearing point separate from the bearings on the housing, wherein the rotary catch, the latching pawl, or some combination thereof, contact the housing at the at least one additional bearing point.

4. The locking element as claimed in claim 1, comprising a second pawl configured to rotate at least partially independently of the latching pawl, wherein the second pawl is displaced parallel to the main plane of extension of the housing during the accident.

5. The locking element as claimed in claim 4, wherein the second pawl has the same bearing as the latching pawl.

6. The locking element as claimed in claim 1, wherein a first torsion spring is coupled to the rotary catch, a second torsion spring is coupled the latching pawl, and the first and second torsion springs prestress the rotary catch and latching prawl.

7. A locking element for a vehicle seat for locking a backrest to a seat part, the backrest to a body of the vehicle, or some combination thereof, comprising:
  a rotary catch comprising a first oval-shaped opening, wherein the rotary catch is rotatably mounted about a first bearing on a housing of the vehicle seat in a right-aligned position, and the rotary catch is configured to interact with a pin in a locking manner, and wherein the right-aligned position forms a first gap between a right-hand portion of the rotary catch and the first bearing; and a latching pawl comprising a second oval-shaped opening, wherein the latching pawl is rotatably mounted about a second bearing on the housing in the right-aligned position, the latching pawl is configured to secure the rotary catch in a locking position, and the right-aligned position forms a second gap between a right-hand portion of the latching pawl and the second bearing, and wherein the rotary catch and latching pawl are configured to be laterally displaced within the housing by a lateral force to move the rotary catch and the latching pawl to a left-aligned position in which the rotary catch and the latching pawl bear against the housing after moving to the left-aligned position, and wherein the left-aligned position forms a third gap between a left-hand portion of the rotary catch and the first bearing, and the left-aligned position forms a fourth gap between a left-hand portion of the latching pawl and the second bearing.

8. A locking element for a vehicle seat for locking a backrest to a seat part, the backrest to a body of the vehicle, or some combination thereof, comprising:
   a rotary catch rotatably mounted about a first bearing on a housing of the vehicle seat and configured to interact with a pin in a locking manner by rotation into a locking position; and
   a latching pawl rotatably mounted about a second bearing on the housing and configured to secure the rotary catch in the locking position, wherein the rotary catch and latching pawl are laterally translated within the housing by a lateral force to move the rotary catch and the latching pawl to contact a lateral portion of the housing while maintaining the locking position between the latching pawl and the rotary catch, and wherein the lateral portion is separate from the first and second bearings.

* * * * *